(12) United States Patent
Verhoog (10) Patent No.: US 9,939,043 B2
(45) Date of Patent: Apr. 10, 2018

(54) PENDULAR DAMPING DEVICE FOR MOTOR VEHICLE TRANSMISSION (71) Applicant: VALEO EMBRAYAGES, Amiens (FR)

(72) Inventor: Roel Verhoog, Gournay sur Aronde (FR)

(73) Assignee: Valeo Embrayages, Amiens (FR)

(*) Notice: Subject to any disclaimer, the term of this patent is extended or adjusted under 35 U.S.C. 154(b) by 0 days.

(21) Appl. No.: 14/395,610

(22) PCT Filed: Apr. 17, 2013

(86) PCT No.: PCT/FR2013/050839
§ 371 (c)(1),
(2) Date: Oct. 20, 2014

(87) PCT Pub. No.: WO2013/156733
PCT Pub. Date: Oct. 24, 2013

(65) Prior Publication Data
US 2015/0075320 A1    Mar. 19, 2015

(30) Foreign Application Priority Data
Apr. 20, 2012 (FR) ...................... 12 53658

(51) Int. Cl.
F16F 15/12    (2006.01)
F16F 15/14    (2006.01)
F16F 15/31    (2006.01)

(52) U.S. Cl.
CPC ............ *F16F 15/145* (2013.01); *F16F 15/31* (2013.01); *Y10T 74/2128* (2015.01)

(58) Field of Classification Search
CPC ............... F16F 15/1414; F16F 15/1202; F16F 15/13128; F16F 15/31; F16F 15/28
USPC ....................................... 74/574.2
See application file for complete search history.

(56) References Cited

U.S. PATENT DOCUMENTS

| 2,272,189 | A | * | 2/1942 | De Pew ........................ 74/604 |
| 6,450,065 | B1 | * | 9/2002 | Eckel et al. ................. 74/574.4 |
| 8,800,731 | B2 | * | 8/2014 | Engelmann et al. ......... 188/290 |
| 2011/0179782 | A1 | * | 7/2011 | Huegel et al. ................ 60/338 |

(Continued)

FOREIGN PATENT DOCUMENTS

| CN | 101067436 A | 11/2007 |
| CN | 101086290 A | 12/2007 |

(Continued)

*Primary Examiner* — Vicky A Johnson
(74) *Attorney, Agent, or Firm* — Berenato & White, LLC (57) ABSTRACT A pendulum damping device for a motor vehicle transmission, having at least one pendulum mass (33), a central part (33a) of which is mounted movably on a support (26) capable of pivoting around an axis, and having at least one roller (36) mounted radially between the radially outer periphery of the central part (33a) and a radially outer part of the support (26), in such a way that during operation, the central part (33a) of the pendulum mass (33) abuts radially outwardly against the roller (36), the latter (36) in turn abutting radially outwardly against the support (26). The pendulum mass (33) comprises at least one lateral part (33b) fastened to the central part (33a) and designed so that the center of gravity of the pendulum mass (33) is situated radially outside the contact regions between the central part (33a) of the pendulum mass (33) and the roller (36).

22 Claims, 12 Drawing Sheets (56) References Cited

U.S. PATENT DOCUMENTS

| | | |
|---|---|---|
| 2011/0186395 A1 | 8/2011 | Bai et al. |
| 2013/0098198 A1* | 4/2013 | Geist et al. ..................... 74/604 |
| 2014/0251075 A1* | 9/2014 | Verhoog ..................... 74/574.2 |

FOREIGN PATENT DOCUMENTS

| | | |
|---|---|---|
| DE | 102004011830 | 9/2004 |
| DE | 102010049556 | 5/2011 |
| DE | 102011012276 | 9/2011 |
| EP | 0250913 A2 | 1/1988 |
| WO | 2010066218 | 6/2010 |

\* cited by examiner

PENDULAR DAMPING DEVICE FOR MOTOR VEHICLE TRANSMISSION

CROSS-REFERENCE TO RELATED APPLICATIONS AND CLAIM TO PRIORITY

This application is a national stage application of International Application No. PCT/FR2013/050839 filed Apr. 17, 2013, which claims priority to French Patent Application No. 1253658 filed Apr. 20, 2012, of which the disclosures are incorporated herein by reference and to which priority is claimed.

FIELD OF THE INVENTION

The present invention relates to a pendulum damping device, in particular for a motor vehicle transmission.

BACKGROUND OF THE INVENTION

The documents DE 10 2010 049 556, DE 10 2004 011 830, and WO 2010/066218 each describe a pendulum damping device, in particular for a motor vehicle transmission, having pendulum masses mounted movably on a support capable of pivoting around an axis. Two rollers are mounted radially between the radially outer periphery of each pendulum mass and a radially outer part of the support in such a way that, during operation, the pendulum mass abuts radially outwardly against the rollers, the latter in turn abutting radially outwardly against the support.

The centers of gravity of the pendulum masses are thus situated radially inside the contact regions between the pendulum masses and the rollers, which creates a risk of tilting of the masses out of the radial plane.

Such devices, in which the rollers operate in compression, are relatively reliable.

In the document DE 10 2010 049 556, for example, a radial annular plate is mounted on the support in order to limit tilting of the pendulum masses and axially retain the rollers.

The masses of the pendulum masses are relatively small and cannot be increased without requiring a redesign of the device. This is because the space available for receiving each of the pendulum masses, demarcated in particular by the support and the aforementioned retaining plate, is relatively limited. The efficiency of a pendulum damping device of this kind is thus likewise limited.

SUMMARY OF THE INVENTION

The object of the invention is in particular to provide a simple, effective, and economical solution to this problem.

It proposes for this purpose a pendulum damping device, in particular for a motor vehicle transmission, having at least one pendulum mass, a central part of which is mounted movably on a support capable of pivoting around an axis, and having at least one roller mounted radially between the radially outer periphery of the central part and a radially outer part of the support, in such a way that during operation, the central part of the pendulum mass abuts radially outwardly against the roller, the latter in turn abutting radially outwardly against the support, wherein the pendulum mass has at least one lateral part fastened to the central part and designed so that the center of gravity of the pendulum mass is situated radially outside the contact regions between the central part of the pendulum mass and the roller.

Shifting the center of gravity to outside the aforesaid contact regions improves the stability of the masses. The lateral part furthermore allows a substantial increase in the mass of the pendulum mass and thus also in its effectiveness. The effectiveness of the pendulum mass is also increased by the radially outward shift of its center of gravity.

According to a characteristic of the invention, the pendulum mass has two opposite lateral parts fastened to the central part and extending on either side of the support.

The pendulum mass then has a symmetrical and balanced structure.

The support can have at least one window in which the central part of the pendulum mass is mounted.

In addition, the radially outer periphery of the central part of the pendulum mass and the radially outer part of the support can each have a concave region forming a rolling track for a roller.

According to another characteristic of the invention, each lateral part is a generally arc-shaped plate, the radially outer periphery of which is situated radially outside the outer periphery of the central part of the pendulum mass, facing the radially outer part of the support.

In an embodiment of the invention, at least one of the lateral parts has a stud inserted into a support hole, said hole being oblong and arc-shaped, and said stud being capable of being displaced along said hole, or conversely the displacement of the pendulum mass being limited by abutment of the stud against the circumferential ends of said hole.

The radially inner periphery and/or the circumferential ends of the central part of the pendulum mass can have elastically deformable stop means intended to come into abutment against the support.

As a variant, the circumferential ends of the lateral part of the pendulum mass are capable of coming into abutment against stop members of the support.

In addition, at least one region of the central part of the pendulum mass can be constituted in one piece with at least one of the lateral parts.

The ends of the rollers can have restricted regions for abutment against the lateral parts of the pendulum masses, in order to limit lateral displacement of the roller.

The invention likewise relates to a torque transmission device having a torque input element and a torque output element, wherein it has a pendulum damping device of the aforementioned type, the torque output element having an annular web serving as support for at least one pendulum mass, elastic members being mounted between the torque input element and the annular web.

As a variant, the invention also relates to a torque transmission device for a motor vehicle, having a torque input element, a torque output element, and at least one group of elastic members mounted between the torque input element and torque output element and acting oppositely to the rotation of one of said elements with respect to the other, the elastic members of this group being arranged in series by means of a phasing member in such a way that the elastic members of said group deform in phase with one another, wherein it has a pendulum damping device of the aforementioned type, the phasing member forming the support of the pendulum mass.

BRIEF DESCRIPTION OF THE DRAWINGS

The invention will be better understood, and other details, characteristics, and advantages of the invention will emerge, after reading the description below that is provided in non-limiting fashion with reference to the attached drawings, in which.

DETAILED DESCRIPTION

Figure 1:
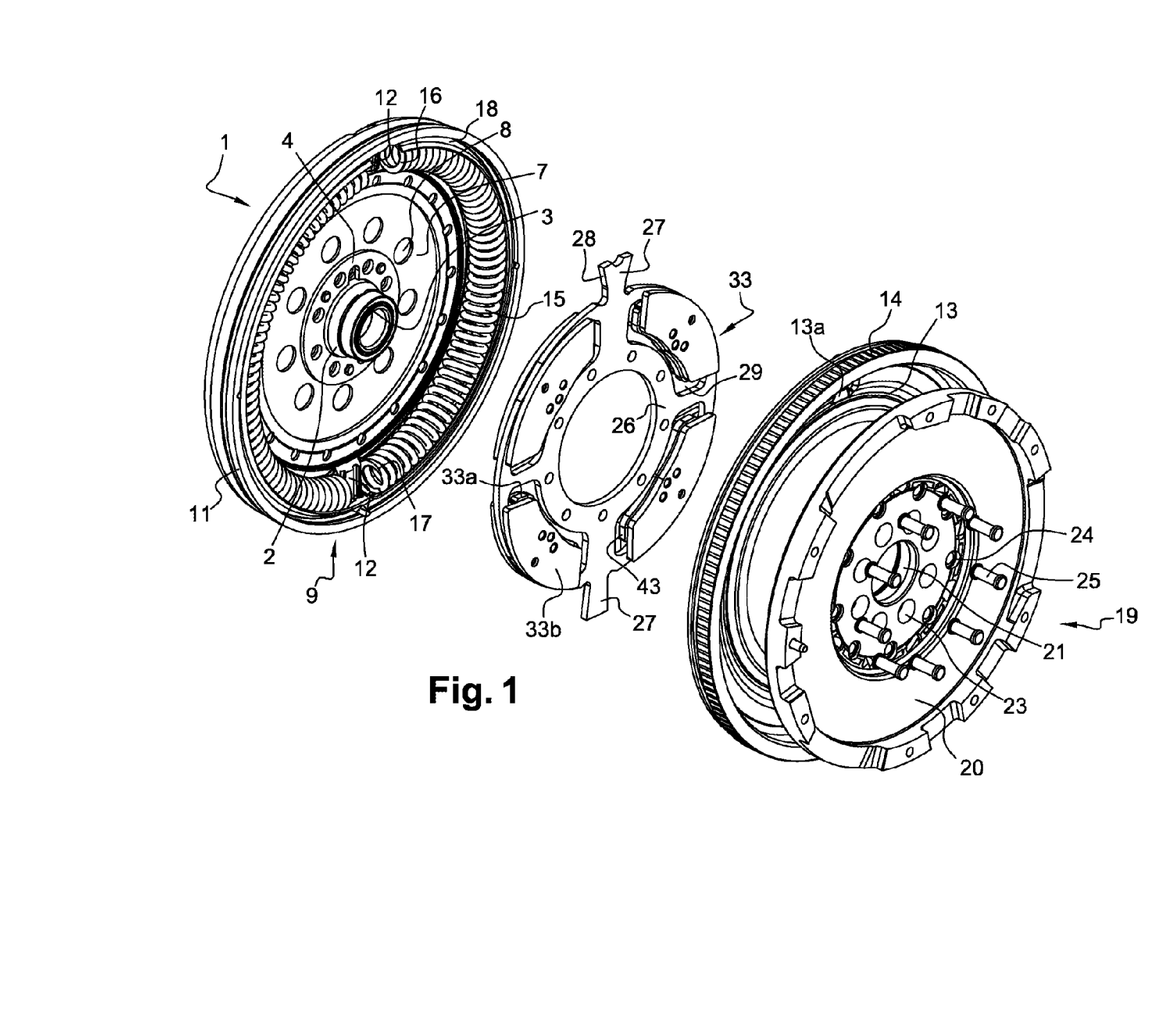
FIG. 1 is an exploded perspective view of a torque transmission device equipped with a pendulum damping device according to a first embodiment of the invention.
Figure 2:
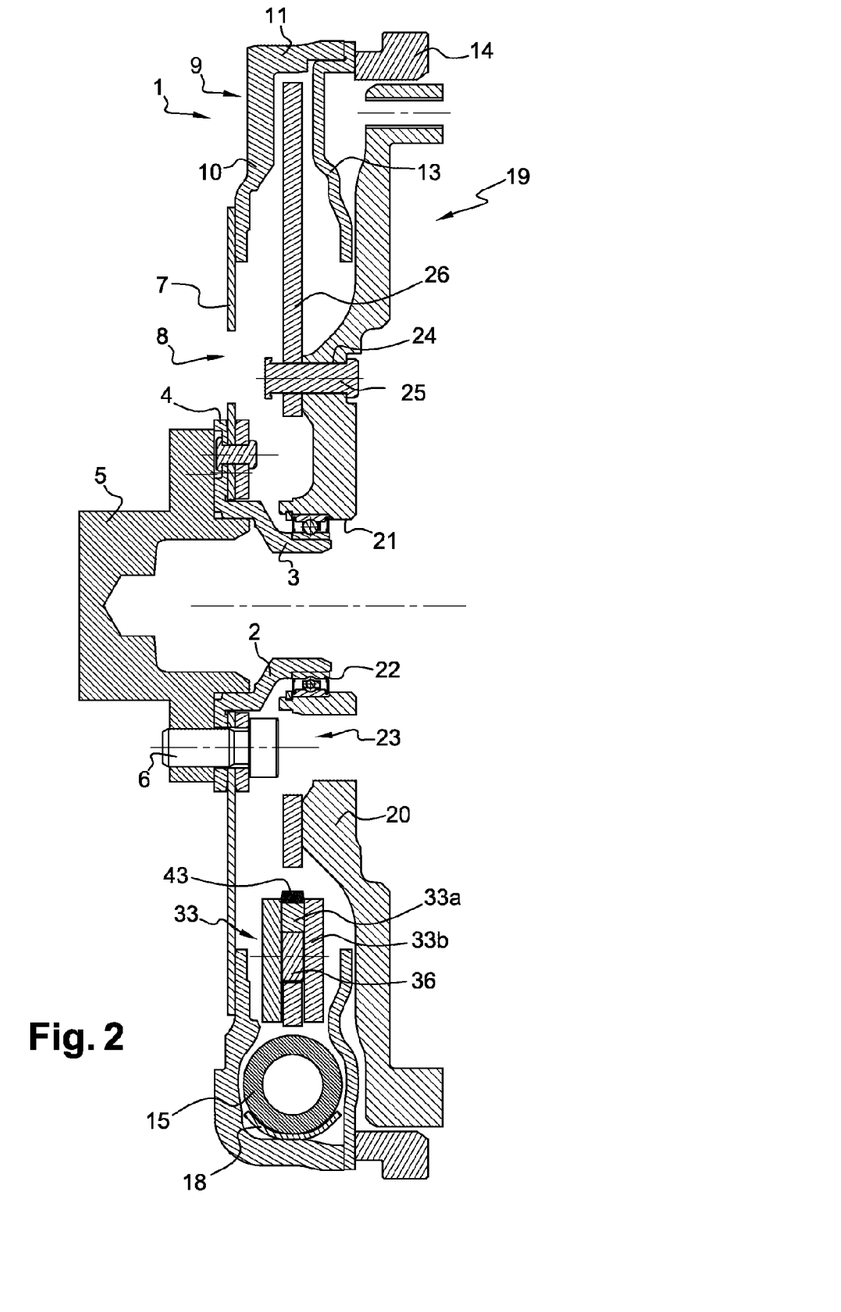
FIG. 2 is a longitudinally sectioned view of the torque transmission device of FIG. 1.

A torque transmission device according to a first embodiment of the invention, existing in the form of a dual mass flywheel, is depicted in FIGS. 1 and 2. It has a primary flywheel 1 comprising a central hub 2, called the "primary hub," comprising a cylindrical tubular part 3 from which a radial part 4 extends radially outward. Radial part 4 of primary hub 2 is fastened to the end of a crankshaft 5 (FIG. 2) of an internal combustion engine by means of screws 6. This radial part 4 is also fastened to the radially inner periphery of an annular metal sheet 7 that is or is not axially flexible. Said metal sheet 7 has holes 8 in the center part, the function of which will be described later.

An annularly shaped primary inertial mass 9 is fastened to the radially outer periphery of annular metal sheet 7.

Primary inertial mass 9 has a part 10 (FIG. 2) extending radially, the radially outer periphery of which is extended toward the front by a cylindrical rim 11. The front face of radial part 10 has two diametrically opposed projecting elements 12 (FIG. 1) intended to constitute abutment faces.

The free edge of cylindrical rim 11 is fastened, for example by welding, to the radially outer periphery of another annular metal sheet 13, more particularly to the rear radial face of said metal sheet 13. A ring gear 14, intended to engage with a starter belt, is fastened onto the front face of metal sheet 13.

Metal sheet 13 has two diametrically opposed elements 13a, projecting axially toward the rear, arranged opposite projecting elements 12 of the primary inertial mass and each forming two abutment faces.

Primary inertial mass 9 and annular metal sheet 13 demarcate an internal space intended to be filled with grease and serving to receive curved elastic members 15.

These elastic members 15 are helical compression springs mounted in the aforementioned internal space. More particularly, during assembly, ends 16, 17 of the curved elastic members come into abutment against the abutment faces defined by projecting members 12, 13a. Primary inertial mass 9 and annular metal sheet 13 thus form guide washers.

Channels 18 are mounted between the inner wall of cylindrical rim 11 and elastic members 15, said channels 18 serving for abutment of elastic members 15 when the latter become deformed by centrifugal force during operation.

A secondary flywheel 19 is centered and mounted rotationally movably on primary flywheel 1.

Secondary flywheel 19 has a so-called "secondary" inertial mass 20 having at its center a bore 21 serving for mounting and centering of secondary inertial mass 20 on cylindrical part 3 of primary hub 2 by means of a ball bearing 22 (FIG. 2).

Secondary inertial mass 20 has holes 23 (FIG. 1) serving for passage of a tool for screwing or unscrewing screws 6 for fastening primary flywheel 1 on the end of crankshaft 5, and holes 24 serving for mounting rivets 25. Said rivets 25 in particular allow an annular web 26 to be fastened to second inertial mass 20. Holes 8 formed in metal sheet 7 of primary flywheel 1 are arranged facing rivets 25 and allow passage of a riveting tool.

Figure 3:
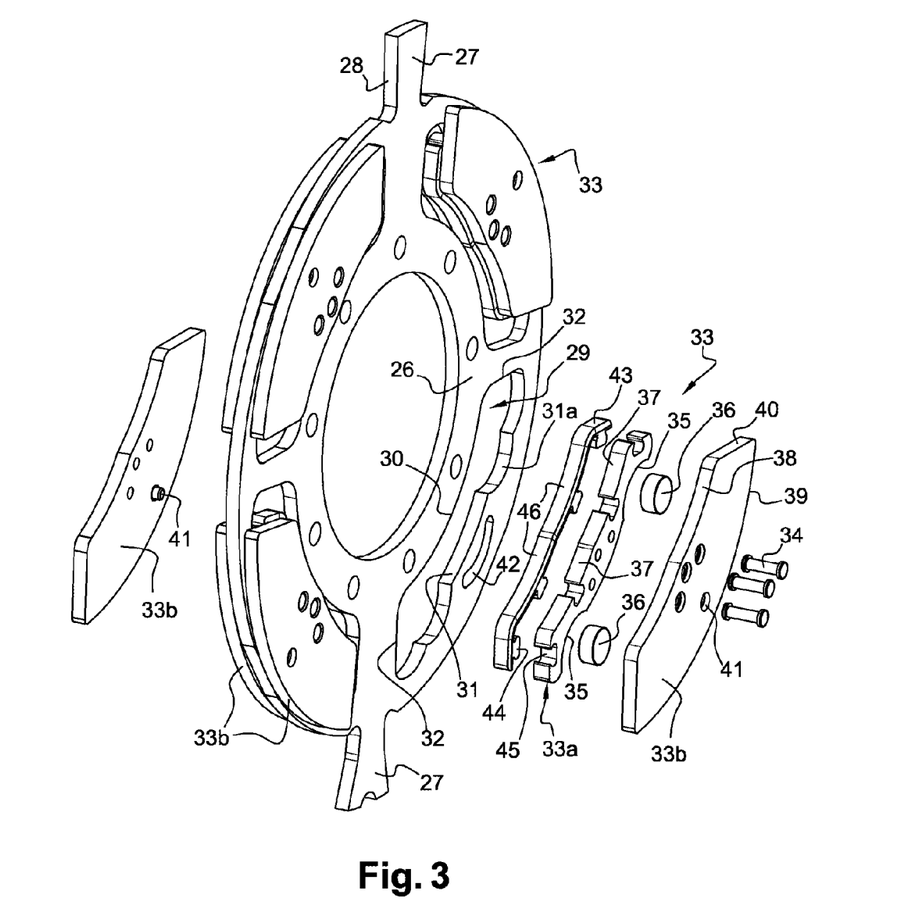
FIG. 3 is a partly exploded perspective view of the pendulum damping device of FIGS. 1 and 2.
Figure 4:
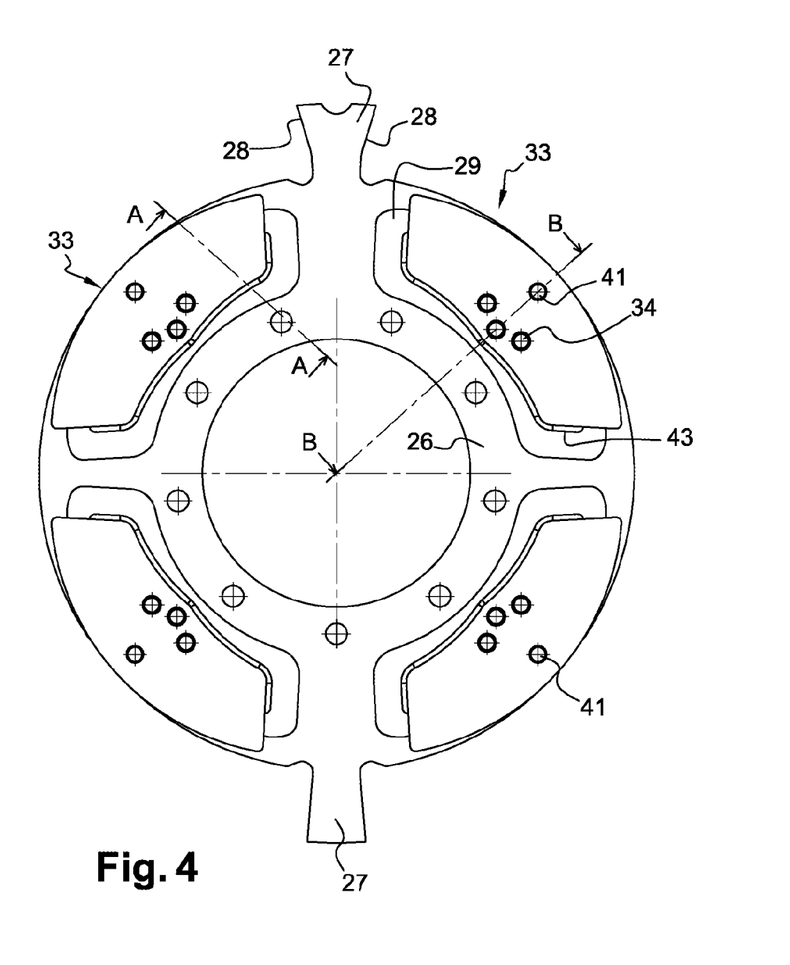
FIG. 4 is a frontal view of the pendulum damping device of FIG. 3.
Figure 5:
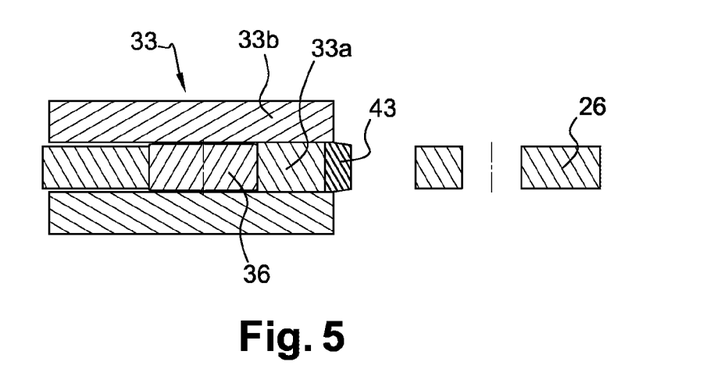
FIGS. 5 and 6 are views respectively of sections A-A and B-B in FIG. 4.
Figure 6:
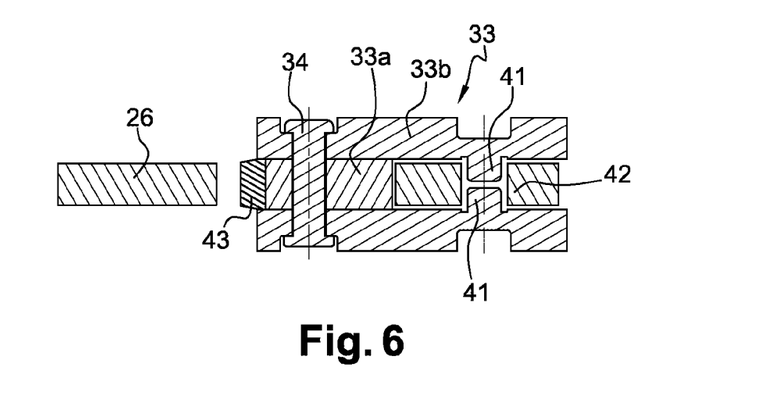

As is better evident from FIG. 3, annular web 26 has an annular part from which two diametrically opposed tabs 27 extend radially outward.

Each tab 27 has two opposite faces 28 for abutment of the elastic members, which form an angle with respect to one another and diverge outward from one another.

Elastic members 15 allow vibrations and rotational irregularities of the engine to be damped and absorbed, as is known per se.

In an embodiment that is not depicted, elastic members 15 are associated with friction means that allow energy to be dissipated via friction.

No supplementary friction means is added in the embodiment depicted, however, energy being dissipated by the natural friction between primary mass 9 and secondary mass 19, due largely to the friction of elastic members 15.

Annular web 26 has windows 29, for example four regularly distributed windows, each window being demarcated by an inner peripheral edge 30, an outer peripheral edge 31, and two circumferential ends 32 (FIG. 3). Outer peripheral edge 31 has two concave regions 31a.

Pendulum masses 33 are mounted on the annular web, as is better evident from FIG. 3; each pendulum mass 33 has a central part 33a mounted in window 29, and two lateral parts 33b fastened (i.e., non-moveably attached) on either side of central part 33a on the exterior of the corresponding window 29. The lateral parts 33b are rigidly fastened (i.e., non-moveably attached) to the central part 33a by rivets 34 (FIG. 3), for example three in number.

Central part 33a is generally arc-shaped and has a radially inner edge, a radially outer edge, and two circumferential ends. The radially outer edge has two concave regions 35 forming rolling tracks for two rollers 36. The radially inner edge is made up of two regions 37 each extending over one half of said edge, each region 37 being curved and having a radius of curvature substantially equal to the radius of inner edge 30 of the corresponding window 29 of annular web 26.

Each lateral part 33b is generally arc-shaped and has a radially inner edge 38, a radially outer edge 39, and two circumferential ends 40 (FIG. 3). Radially outer edges 39 of lateral parts 33b are situated radially outside radially outer edges 31 of windows 29.

Figure 7:
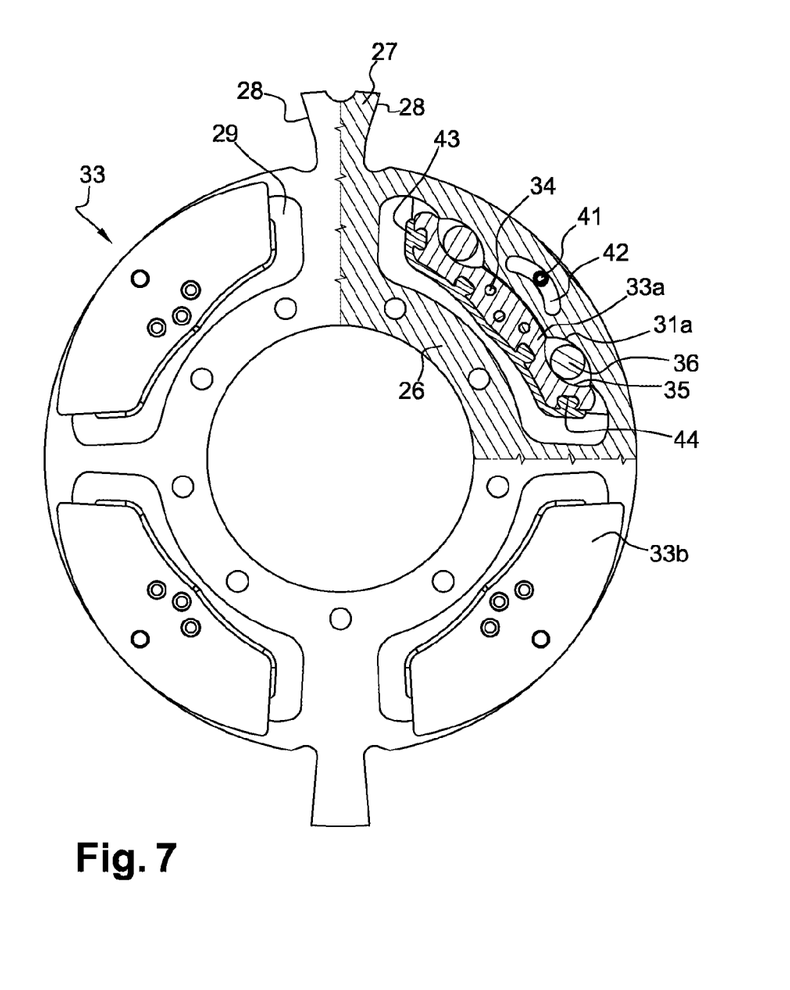
FIGS. 7 and 8 are partial sectioned views of the aforementioned damping device with the pendulum masses in two different positions.
Figure 8:
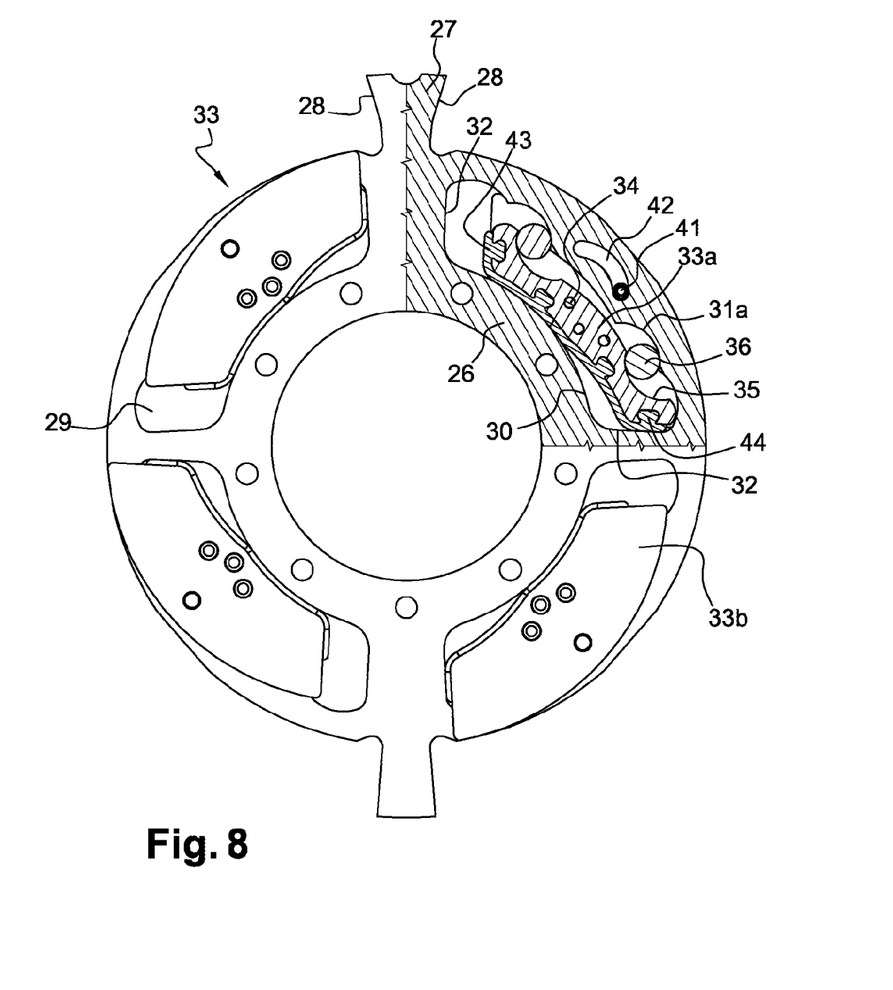

Each lateral part 33b has a stud 41, studs 41 of the two lateral parts 33b of a single pendulum mass 33 being inserted into an oblong arc-shaped hole 42 of annular web 26 and being capable of being displaced along said hole (FIGS. 3, 7, and 8). The displacement of pendulum mass 33 is limited by abutment of said studs 41 against the circumferential ends of said oblong hole 42.

Each central part 33a can have elastically deformable damping means at its circumferential ends and at its radially inner edge 37, intended to come into abutment against circumferential ends 32 and radially inner edge 30 of the corresponding window 29. These damping means are constituted, for example, by a elastomer strip 43 extending continuously from one circumferential end to the other, by way of the radially inner edge of central part 33a. This strip 43 has dovetail blocks 44 on its face toward central part 33a, which are inserted and immobilized in complementarily shaped openings 45 of central part 33a that terminate at the circumferential ends and at the radially inner edge. In addition, the shape of strip 43 conforms to the profile of the inner peripheral edge of central part 33a, so that said strip 43 likewise exhibits two adjacent concave regions 46, each region 46 having a radius of curvature substantially equal to the radius of radially inner edge 30 of the corresponding window 29. Preferably the radially inner edge of central part 33a is situated radially externally with respect to radially inner edges 38 of lateral parts 33b, so that strip 43 is effectively confined and held between lateral parts 33b after mounting.

Strip 43 projects beyond circumferential ends 40 and beyond inner edge 38 of lateral parts 33b of masses 33 so as to come into abutment against circumferential ends 32 and against inner edge 30 of the corresponding window 29.

During operation, when a torque is transmitted from primary flywheel 1 to secondary flywheel 19, elastic members 15 come into abutment at a first end 16 or 17 against abutment faces 12, 13a of primary flywheel 1, and at a second end 17 or 16 against abutment faces 28 of tabs 27 of annular web 26 belonging to secondary flywheel 19.

The rotation of annular web 26 causes centrifugal motion of pendulum masses 33, which come into abutment against annular web 26 by means of rollers 36. The latter are thus loaded in compression.

In addition, pendulum masses 33 can roll on rollers 36 and can become displaced in the manner of pendulums with respect to annular web 26. The trajectory of pendulum masses 33 is defined in particular by the shape of concave regions 31a, 35. Masses 33 can thus oscillate in pendulum fashion between two extreme positions (one of which is illustrated in FIG. 8), by way of the intermediate position depicted in FIG. 7.

This pendulum motion of masses 33 allows vibrations and rotational irregularities of the engine to be damped and absorbed.

The shape of lateral parts 33b is such that the center of gravity of each pendulum mass 33 is situated radially outside the contact regions between central part 33a of pendulum mass 33 and rollers 36.

Shifting the center of gravity outside the aforementioned contact regions improves the stability of pendulum masses 33. Lateral parts 33b moreover allow a substantial increase in the mass of each of pendulum masses 33, and thus also in its effectiveness. It is also noteworthy that the farther the center of gravity of a pendulum mass 33 is located from the rotation axis of its support, the greater the effectiveness of pendulum mass 33.

FIG. 7 shows pendulum masses 33 in a position in which they are centered circumferentially in windows 29.

FIG. 8, in contrast, shows pendulum masses 33 in an abutment position in which they come into abutment against ends 32 of windows 29 and against inner edges 30 of windows 29, by means of elastomeric strip 43.

In this abutment position, masses 33 are positioned obliquely with respect to the circumferential direction.

Concurrently, crushing of elastomeric strip 43 is limited by the abutment of pegs 41 against the corresponding end of oblong hole 42.

Figure 9:
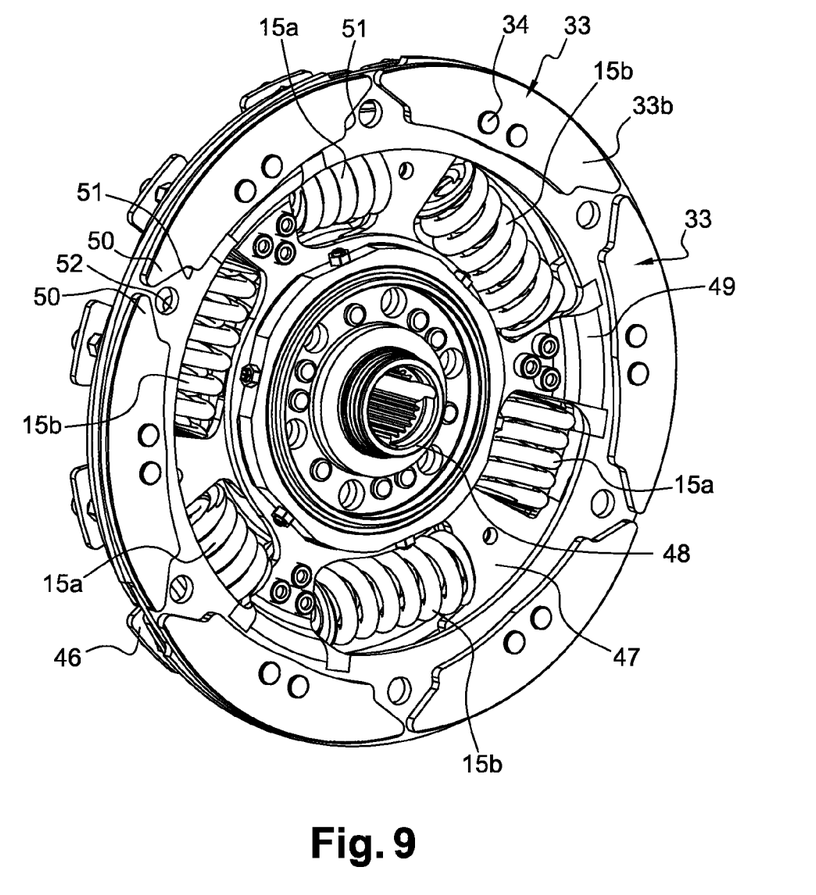
FIG. 9 is a perspective view of part of a torque transmission device equipped with a pendulum damping device according to a second embodiment.

FIG. 9 illustrates a pendulum damping device according to another embodiment of the invention, conventionally having a torque input element, a torque output element, and two groups of elastic members 15a, 15b mounted between the torque output and torque input elements and acting oppositely to the rotation of one of said torque input and output elements with respect to the other.

Torque input element is constituted in this case by two guide washers, only one of which (labeled 46) is visible in FIG. 9. The torque output element is constituted here by an annular web 47 riveted onto an inner hub 48 intended to be coupled to an input shaft of a gearbox.

As is known per se, elastic members 15a, 15b of each group are arranged in series by means of a phasing member 49, so that elastic members 15a, 15b of each group become deformed in phase with one another.

In this embodiment, pendulum masses 33 are supported by phasing member 49.

Figure 10:
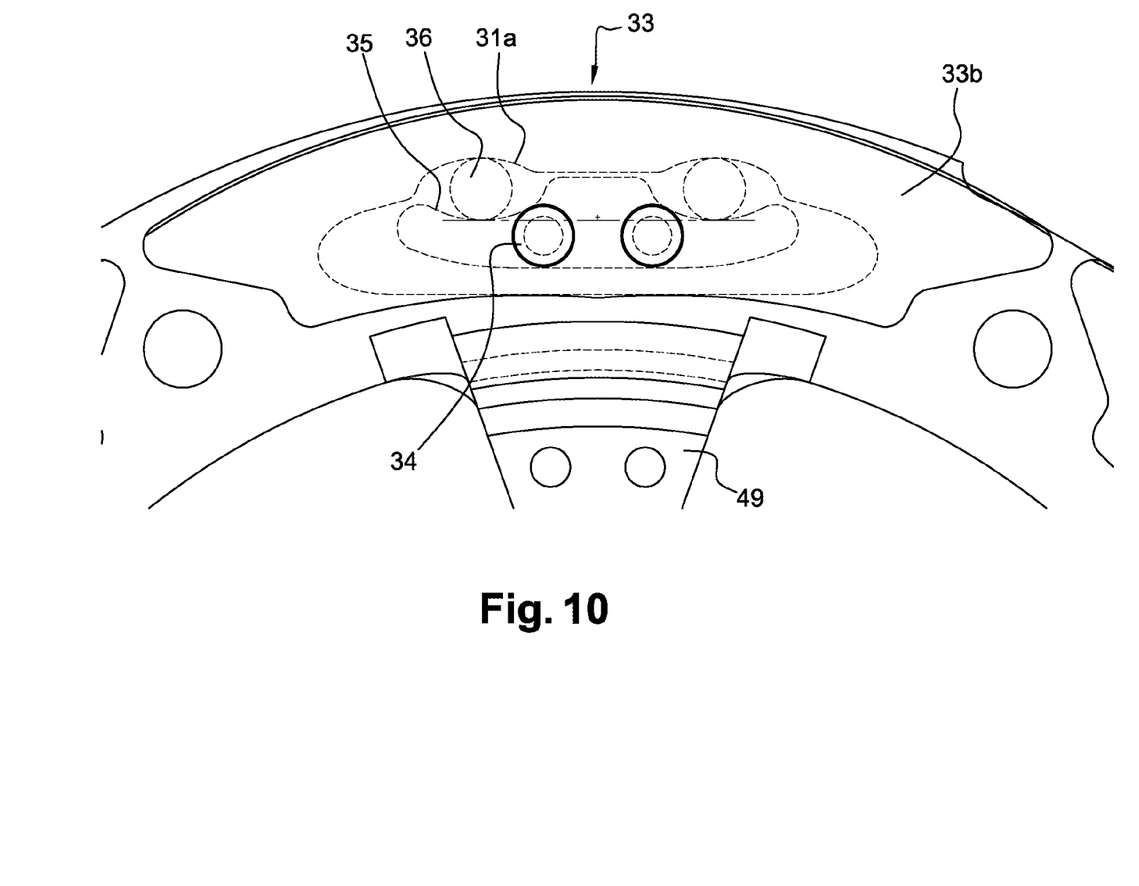
FIG. 10 is a frontal view of part of the pendulum damping device of FIG. 9.

As before, windows 29 are arranged in phasing member 49, central parts 33a of pendulum masses 33 being mounted in windows 29. Lateral parts 33b are furthermore mounted on either side of each central part 33a.

Circumferential ends 33b of the lateral parts of the pendulum masses each have a first region situated radially externally, forming a finger 50 whose rounded end is capable of coming into abutment against the opposite finger 50 of the adjacent mass 33.

The circumferential ends of lateral parts 33b of pendulum masses 33 furthermore have second regions 51 exhibiting planar surfaces that extend substantially radially and are intended to come into abutment against abutment studs mounted in holes 52 of phasing member 49.

As before, the shape of lateral parts 33b is such that the center of gravity of each pendulum mass 33 is situated radially outside the contact regions between central part 33a of pendulum mass 33 and rollers 36.

Figure 11:
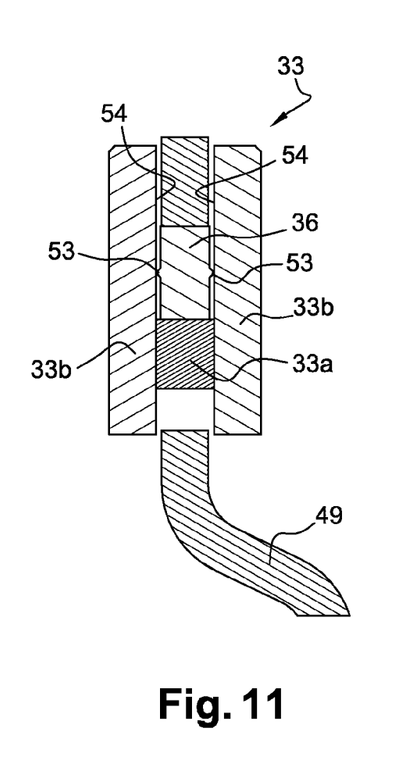
FIGS. 11 to 13 are longitudinally sectioned views of part of the pendulum damping device of FIG. 10, respectively illustrating three variants.

As depicted in FIG. 11, the ends of rollers 36 can have pins 53 situated on the axis of the rollers and intended to come into abutment against the opposite faces, called inner faces 54, of lateral parts 33b of masses 33. This allows the lateral displacement of rollers 36 to be limited while still obtaining a limited friction surface.

Figure 12:
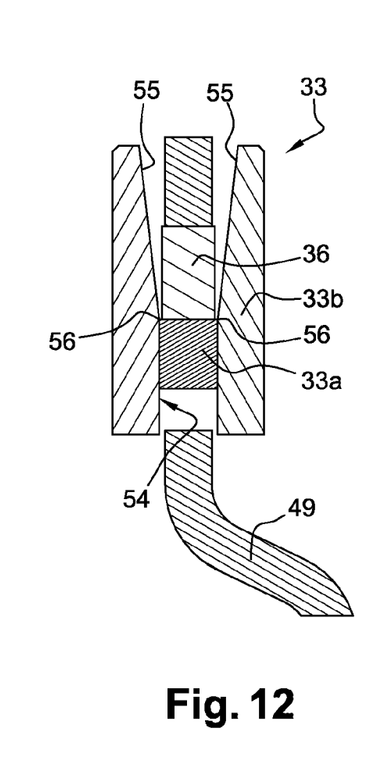

In a variant illustrated in FIG. 12, inner faces 54 of lateral parts 33b of masses 33 can have radially outer beveled regions 55 that diverge from one another in the radially outward direction. The lateral displacement of rollers 36 during operation is thus limited by abutment of the latter against inner faces 54 at point-contact regions 56 located radially inwardly, i.e. in a low-speed region that generates little friction.

Figure 13:
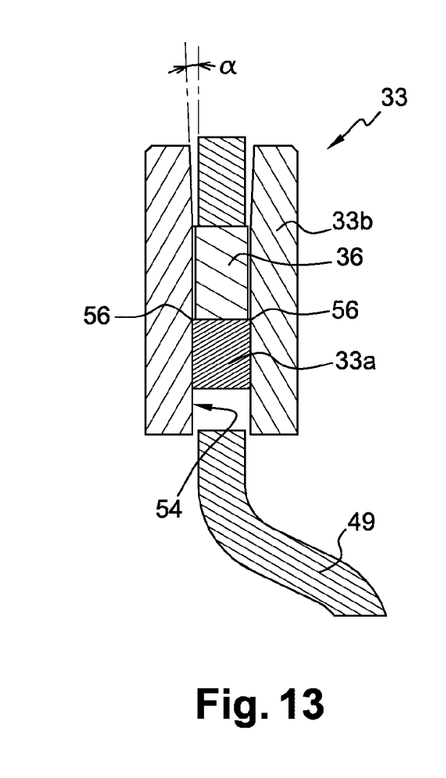
Figure 14:
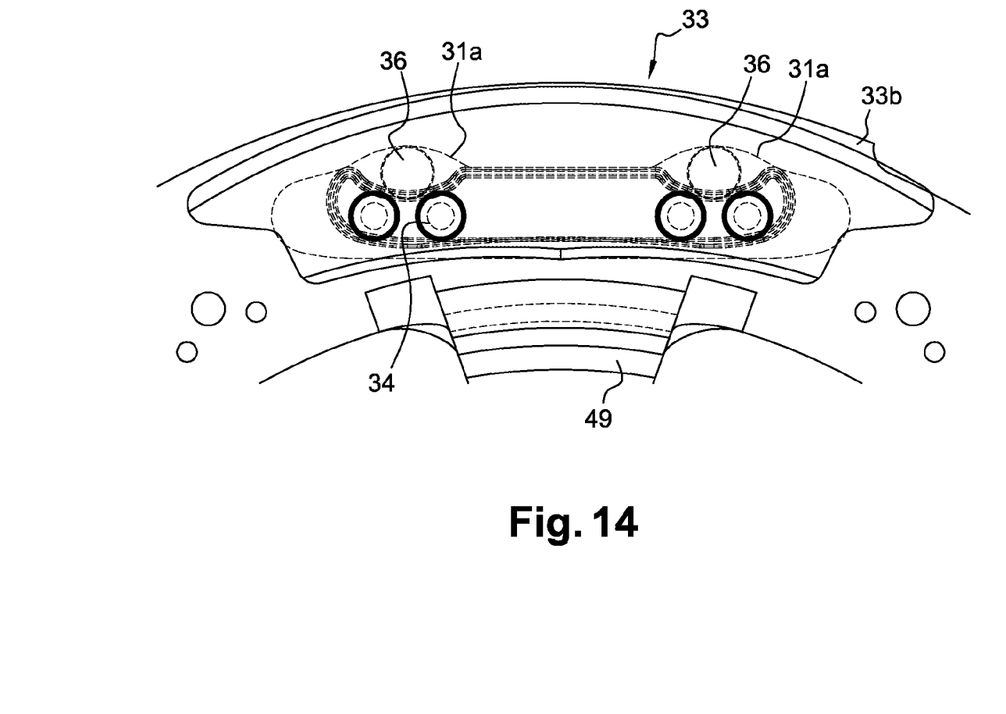
FIG. 14 is a frontal view of part of the pendulum damping device according to a third embodiment of the invention.

Lastly, FIG. 13 illustrates another variant in which inner faces 54 form an angle a with the radial direction in such a way that they diverge from one another in the radially outward direction. This angle is implemented by stamping, or directly by way of the shape of the corresponding central part 33a. In this case as well, the lateral displacement of rollers 36 is limited by abutment of the latter against inner faces 54 at point-contact regions 56 located radially inwardly, i.e. in a low-speed region that generates little friction.

FIGS. 13 to 16 illustrate other embodiments that differ from the embodiment of FIG. 19 in that at least one region of central part 33a is integral with at least one of lateral parts 33b.

Figure 15:
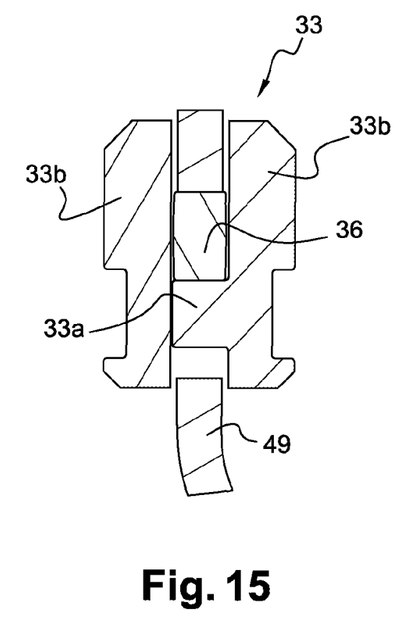
FIGS. 15 and 16 are sectioned views of part of the pendulum damping device of FIG. 14, illustrating two possible variants.
Figure 16:
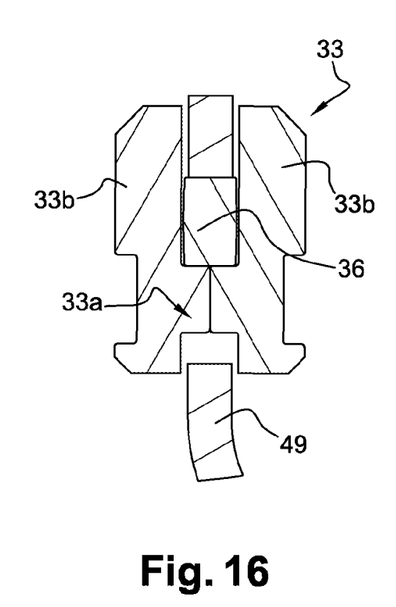

In particular, FIG. 15 illustrates a variant in which central part 33a is constituted integrally with one of lateral parts 33b. FIG. 16 illustrates another variant in which a first half of central part 33a is constituted integrally with one of lateral parts 33b, a second half of central part 33a being constituted integrally with the other of lateral parts 33b.

In this case as well, the shape of lateral parts 33b is such that the center of gravity of each pendulum mass 33 is situated radially outside the contact regions between central part 33a of the pendulum mass 33 and rollers 36.

The invention claimed is:

1. A pendulum damping device for a motor vehicle transmission, the pendulum damping device comprising:
   at least one pendulum mass (33) having a central part (33a) mounted movably on a support (26, 49) pivotable around an axis; and
   at leat one roller (36) mounted radially between a radially outer periphery of the central part (33a) and a radially outer part of the support (26, 49), in such a way that during operation, the central part (33a) of the at least one pendulum mass (33) abuts radially outwardly against the at least one roller (36), the at least one roller (36) abutting radially outwardly against the support (26, 49);
   the at least one pendulum mass (33) comprising at least one lateral part (33b) rigidly fastened to the central part (33a) so that a center of gravity of the at least one pendulum mass (33) is situated radially outside contact regions between the central part (33a) of the at least one pendulum mass (33) and the at least one roller (36).

2. The device according to claim 1, wherein the pendulum mass (33) has two opposite lateral parts (33b) fastened to the central part (33a) and extending on either side of the support (26, 49).

3. The device according to claim 2, wherein the support (26, 49) has at least one window (29) in which the central part (33a) of the pendulum mass (33) is mounted.

4. The device according to claim 2, wherein the radially outer periphery of the central part (33a) of the pendulum mass (33) and the radially outer part of the support (26, 49) each have a concave region (31a, 35) forming a rolling track for the at least one roller (36).

5. The device according to claim 2, wherein each lateral part (33b) is a generally arc-shaped plate, the radially outer periphery (39) of which is situated radially outside the outer periphery of the central part (33a) of the pendulum mass (33), facing the radially outer part of the support (26, 49).

6. The device according to claim 2, wherein at least one of the lateral parts (33b) has a stud (41) inserted into a support hole (42), the support hole being oblong and arc-shaped, and the stud being capable of being displaced along the support hole (42), or conversely the displacement of the pendulum mass (33) being limited by abutment of the stud (41) against the circumferential ends of the support hole (42).

7. The device according to claim 1, wherein the support (26, 49) has at least one window (29) in which the central part (33a) of the pendulum mass (33) is mounted.

8. The device according to claim 7, wherein the radially outer periphery of the central part (33a) of the pendulum mass (33) and the radially outer part of the support (26, 49) each have a concave region (31a, 35) forming a rolling track for the at least one roller (36).

9. The device according to claim 7, wherein each lateral part (33b) is a generally arc-shaped plate, the radially outer periphery (39) of which is situated radially outside the outer periphery of the central part (33a) of the pendulum mass (33), facing the radially outer part of the support (26, 49).

10. The device according to claim 7, wherein at least one of the lateral parts (33b) has a stud (41) inserted into a support hole (42), the support hole being oblong and arc-shaped, and the stud being capable of being displaced along the support hole (42), or conversely the displacement of the pendulum mass (33) being limited by abutment of the stud (41) against the circumferential ends of the support hole (42).

11. The device according to claim 1, wherein the radially outer periphery of the central part (33a) of the pendulum mass (33) and the radially outer part of the support (26, 49) each have a concave region (31a, 35) forming a rolling track for the at least one roller (36).

12. The device according to claim 11, wherein each lateral part (33b) is a generally arc-shaped plate, the radially outer periphery (39) of which is situated radially outside the outer periphery of the central part (33a) of the pendulum mass (33), facing the radially outer part of the support (26, 49).

13. The device according to claim 11, wherein at least one of the lateral parts (33b) has a stud (41) inserted into a support hole (42), the support hole being oblong and arc-shaped, and the stud being capable of being displaced along the support hole (42), or conversely the displacement of the pendulum mass (33) being limited by abutment of the stud (41) against the circumferential ends of the support hole (42).

14. The device according to claim 1, wherein each lateral part (33b) is a generally arc-shaped plate, the radially outer periphery (39) of which is situated radially outside the outer periphery of the central part (33a) of the pendulum mass (33), facing the radially outer part of the support (26, 49).

15. The device according to claim 14, wherein at least one of the lateral parts (33b) has a stud (41) inserted into a support hole (42), the support hole being oblong and arc-shaped, and the stud being capable of being displaced along the support hole (42), or conversely the displacement of the pendulum mass (33) being limited by abutment of the stud (41) against the circumferential ends of the support hole (42).

16. The device according to claim 1, wherein at least one of the lateral parts (33b) has a stud (41) inserted into a support hole (42), the hole being oblong and arc-shaped, and the stud being capable of being displaced along the hole (42), or conversely the displacement of the pendulum mass (33) being limited by abutment of the stud (41) against the circumferential ends of the support hole (42).

17. The device according to claim 1, wherein the radially inner periphery and/or the circumferential ends of the central part (33a) of the pendulum mass (33) have elastically deformable stop means (43) intended to come into abutment against the support (26, 49).

18. The device according to claim 1, wherein the circumferential ends (51) of the lateral part (33b) of the pendulum mass (33) are capable of coming into abutment against stop members of the support (49).

19. The device according to claim 1, wherein at least one region of the central part (33a) of the pendulum mass (33) is constituted in one piece with at least one of the lateral parts (33b).

20. The device according to claim 1, wherein the ends of the roller (36) have restricted regions (53, 56) for abutment against the lateral parts (33b) of the pendulum masses (33).

21. A torque transmission device comprising:
a torque input element (1);
a torque output element (19); and
a pendulum damping device comprising:
- at least one pendulum mass (33) having a central part (33a) mounted movably on a support (26, 49) pivotable around an axis, and
- at least one roller (36) mounted radially between a radially outer periphery of the central part (33a) and a radially outer part of the support (26, 49), in such a way that during operation, the central part (33a) of the at least one pendulum mass (33) abuts radially outwardly against the at least one roller (36), the at least one roller (36) abutting radially outwardly against the support (26, 49),
- the at least one pendulum mass (33) comprising at least one lateral part (33b) fastened to the central part (33a) so that a center of gravity of the at least one pendulum mass (33) is situated radially outside contact regions between the central part (33a) of the at least one pendulum mass (33) and the at least one roller (36);

the torque output element having an annular web (26) serving as the support for the at least one pendulum mass (33);

elastic members (15) being mounted between the torque input element and the annular web (26).

22. A torque transmission device for a motor, comprising:
a torque input element (46);
a torque output element (47, 48); and
at least one group of elastic members (15a, 15b) mounted between the torque input element (46) and torque output element (14, 48) and acting oppositely to the rotation of one of the torque input and torque output elements with respect to the other, the elastic members (15a, 15b) of the at least one group being arranged in series by means of a phasing member (49) in such a way that the elastic members (15a, 15b) of the group deform in phase with one another, the torque transmission device further comprising a pendulum damping device including:
- at least one pendulum mass (33) having a central part (33a) mounted movably on a phasing member (49) forming a support (26, 49) pivotable around an axis, and
- at least one roller (36) mounted radially between a radially outer periphery of the central part (33a) and a radially outer part of the support (26, 49), in such a way that during operation, the central part (33a) of the at least one pendulum mass (33) abuts radially outwardly against the at least one roller (36), the at least one roller (36) abutting radially outwardly against the support (26, 49),
- the at least one pendulum mass (33) comprising at least one lateral part (33b) fastened to the central part (33a) so that a center of gravity of the at least one pendulum mass (33) is situated radially outside contact regions between the central part (33a) of the at least one pendulum mass (33) and the at least one roller (36).

* * * * *